United States Patent [19]
Gross et al.

[11] Patent Number: 5,908,587
[45] Date of Patent: Jun. 1, 1999

[54] METHOD OF MAKING FIBRILLOSE ARTICLES

[75] Inventors: Kenneth B. Gross, Troy; Bradley Wendt Kibbel, Ferndale; Richard Michael Schreck, Bloomfield Hills; June-Sang Siak, Troy, all of Mich.

[73] Assignee: General Motors Corporation, Detriot, Mich.

[21] Appl. No.: 08/882,940

[22] Filed: Jun. 26, 1997

[51] Int. Cl.$^6$ .................................. B05B 3/00; B29C 35/02
[52] U.S. Cl. .......................... 264/28; 264/621; 264/628; 264/640; 419/2
[58] Field of Search ................. 264/28, 621, 628, 264/640, 645; 419/2

[56] References Cited

U.S. PATENT DOCUMENTS

| | | | |
|---|---|---|---|
| 2,893,102 | 7/1959 | Maxwell et al. | 264/28 |
| 3,935,099 | 1/1976 | Weaver et al. | 210/43 |
| 4,569,920 | 2/1986 | Smith-Johannsen | 264/28 |
| 4,740,352 | 4/1988 | Takahashi | 419/36 |
| 4,894,194 | 1/1990 | Janney | 264/109 |
| 5,028,362 | 7/1991 | Janney et al. | 264/25 |
| 5,047,181 | 9/1991 | Occhionero et al. | 264/28 |
| 5,047,182 | 9/1991 | Sundback et al. | 264/28 |
| 5,120,477 | 6/1992 | Suey | 264/28 |
| 5,145,908 | 9/1992 | Jenny et al. | 524/827 |
| 5,262,458 | 11/1993 | Bastioli et al. | 524/52 |
| 5,335,712 | 8/1994 | Corbett et al. | 164/97 |
| 5,401,445 | 3/1995 | Menchhofer | 264/13 |
| 5,419,860 | 5/1995 | Menchhofer | 264/63 |
| 5,665,395 | 9/1997 | Quichaud et al. | 425/73 |

FOREIGN PATENT DOCUMENTS 61-94702  5/1986  Japan .

OTHER PUBLICATIONS

M.A. Janney et al, Gelcasting "A Novel Ceramic Forming Process", Ceramic Processing Group, Oak Ridge National Laboratory, Jul. 14, 1995.

*Primary Examiner*—Christopher A. Fiorilla
*Attorney, Agent, or Firm*—Lawrence B. Plant

[57] ABSTRACT

Method of making porous, fibrillose bodies from fibrils bonded together into a self-supporting structure. A mixture of fibrils and a viscous, non-newtonian, liquid vehicle including an organic hydrosorbent and water is (1) injected into a mold, (2) frozen in the mold to form a frozen precursor of the article, (3) ejected from the mold while still frozen, (4) freeze-dried, and (5) finally heated to remove the hydrosorbent and bond the particles together. The process is particularly effective for making fibrillose preforms for infiltrating with metal in the manufacture of metal matrix composites.

12 Claims, No Drawings

METHOD OF MAKING FIBRILLOSE ARTICLES

TECHNICAL FIELD

This invention relates to a method of making fibrillose bodies, and particularly ceramic preforms used in the manufacture of metal matrix composites.

BACKGROUND OF THE INVENTION

It is well known to make particulate bodies for a variety of applications from ceramic or metal equiaxed and/or fibrilose particles by: (1) molding a mixture of the particles and an all organic temporary binder (e.g., wax) to provide a green mass; (2) heating the green mass to remove the temporary binder; and finally, (3) heating the temporary-binder-free mass sufficiently (i.e., time and temperature) to sinter or otherwise bond the particles together into a self-supporting article. Such a technique has been used to make preforms for making "metal matrix composites" (i.e., MMCs) which comprise filler particles dispersed throughout a matrix metal such as Al, Mg, etc. Where the filler particles serve to improve one or more of the mechanical properties (e.g., strength, toughness, lubricity, friction, wear resistance, etc.) of the MMC over the properties of the matrix metal alone. Popular fibrils for making MMCs have an average aspect ratio (i.e., length divided by diameter) of at least 10 to 20, but may be as low as 3 and as high as about 200. The lengths of the fibrils vary from about 10 microns (though smaller are possible) to about 500 microns, and their diameters are generally less than about 10 microns. The filler fibrils will typically constitute about 5% by volume to about 45% by volume of the MMC with the balance being the matrix metal. More specifically, it is known to make MMCs by a process wherein a self-supporting, net shape, porous preform is made from the filler particles, and the preform subsequently infiltrated with the matrix metal by well known wicking or pressure filling (e.g., squeeze casting) techniques. The preform itself is made by molding a mixture of the filler particles and an all organic binder to a desired size and shape, removing the organic binder, and then bonding the particles together. One particular such molding process for making MMC preforms comprises: (1) mixing the filler particles uniformly throughout a fugitive organic binder/vehicle (e.g., wax, polystyrene, polyethylene, etc.) which comprises about 55% to about 95% by volume of the mixture; (2) injecting the binder-particle mixture under pressure into a mold; (3) burning-out/volatizing the fugitive binder; and finally, (4) bonding the particles together into a self-supporting structure. One such process is disclosed in Corbett et al U.S. Pat. No. 5,335,712. Final bonding of the particles may be achieved: (1) by sintering; (2) by initially providing the particles with a coating of colloidal silica or alumina which, upon heating, acts like a high temperature inter-particle glue; or (3) in some cases, by oxidizing the particles to hold them together. In this latter regard, SiC particles can be bonded together by heating the particles to above 600° C. in air to form $SiO_2$ in situ on the surfaces thereof which serves to bond the particles each to others.

One problem with the aforesaid techniques is that super-ambient injection temperatures were needed to melt and volitize the large volume of binder. Another problem is that the articles so made tend to distort (e.g., slump) when heated to remove the binder which typically softens before volatizing. This often happens because the binders are thermolastic and melt before volatizing and/or pyrolyzing. Finally, the time, cost, and environmental considerations associated with burning off large volumes of the organic binder reduce the commercial attractiveness of the process.

Water-based vehicles for the particles have been proposed. In one variant thereof, the vehicle comprises a methycellulose-$H_2O$ gel, wherein a mixture of the particles, methyl cellulose and water are injected into the mold cavity and the mixture heated to about 80° C. in the mold cavity to cause gelling of the methyl cellulose. The gel-bound particles are then removed from the mold and heated to remove the water and the methyl cellulose. In the gelled state, the methyl cellulose is quite weak and often cannot withstand ejection from the molding die or subsequent drying outside of the die. Maxwell et al, U.S. Pat. No. 2,893,102, discloses a freeze-cast process wherein porous bodies are made from equiaxed particles by: (1) forming a thick, moist, nonflowing slip of the particles; (2) injecting the slip with vibration- and vacuum-assisted hand pressure into a mold cavity; (3) freezing the molding in the cavity; (4) removing the frozen molding from the cavity; (5) freeze-drying the molding; and (6) sintering the particles together. The slip contains only a small amount of slip agent (e.g., 3.5 mils of $H_2O$ per 20 gs of particles), and may contain a small amount (e.g., 2% of the weight of the particles) of a binder (e.g., starch or gelatins) to provide some green strength after the water is removed. In another variant of the freeze-cast process according to Occhionero et al., U.S. Pat. No. 5,047,181, porous bodies are made from primarily equiaxed particles by (1) forming a low viscosity, pourable, aqueous slip of the particles; (2) injecting the slip under low (i.e., <200 psi) pressure into a mold cavity, (3) freezing the molding in the cavity, (4) removing the molding from the cavity, (5) freeze-drying the molding, and (6) sintering the particles together. The pourable slip (i.e., viscosity <10 poise at 100 $sec^{-1}$ shear rate) contains at least 35% by volume ceramic or metal particles, and an aqueous vehicle containing a dispersant and a cryoprotectant (which may also be a dispersant, a green strength enhancer and/or viscosity modifier such as methylcellulose or ethylcellulose).

The aforesaid freeze casting processes are incapable of forming fibrillose bodies having a substantially uniform distribution of fibrils throughout. In this regard, when using Maxwell's essentially "dry" (i.e., low water content) process, the intertwining of the fibers prevents their being injected into, or distributed uniformly throughout, the mold cavity under the hand pressures described therein. On the other hand, when using Occhionero's low viscosity process, a uniform moldable mix cannot be produced as the slip agent (i.e., $H_2O$) is so fluid that, even with extensive mixing, it will not break up the fiber bundle raw materials into discrete fibers and distribute them evenly throughout the mix so as to produce a substantially homogeneous moldable mixture. Hence, complex preforms consisting primarily of fibrous materials have not been made commercially to date by water-based molding methods because techniques to uniformly suspend fibrils in a water-based vehicle suitable for molding the preform have not previously been developed. Instead, most commercial fibrous preforms made using a water-based vehicle are made by vacuum forming, wherein fibrils are suspended in water and are drawn onto a porous mandrel by vacuum to build a large mat of fibrous material. The mat is subsequently dried and machined by conventional methods to produce complex-shaped preforms. This method is undesirable for high volume production because more fibril is deposited to make the mat than the final preform requires, machining is a costly way to shape the preform, and fibril density is undesirably not uniform throughout the preforms.

SUMMARY OF THE INVENTION

The present invention is an injection molding process particularly adapted to the forming of a porous, fibrillose body (e.g., MMC preform) having a substantially uniform distribution of fibrils throughout the body wherein the body is formed by the high pressure injection molding of a substantially homogeneous mixture of fibrils suspended in a high viscosity, non-newtonian, aqueous vehicle, frozen, and then freeze dried. The process of the present invention utilizes a non-newtonian, aqueous vehicle containing a relatively small amount of a hydrosorbent material that serves as a vehicle thickener before and during molding and a temporary binder for the particles following drying and before permanent bonding of the molding. The vehicle can be quickly removed following drying without significant distortion of the body prior to finally bonding the particles together into a self-supporting article. More specifically, the invention comprises a process for making a porous, fibrillose self-supporting body from a plurality of metal or ceramic fibrils bonded together including the steps of:

a. preparing a substantially homogeneous, pasty mixture comprising about 5% to about 45% by volume of said fibrils, and about 95% to about 55% by volume of a non-newtonian vehicle for said particles, said vehicle comprising water and a sufficient amount of an organic hydrosorbent to thicken said vehicle to a viscosity of about 20 poise to about 1000 poise and produce a said mixture which is capable of withstanding mixing shear energies of at least about 60 Joules/cm$^3$ without separation of said water from said hydrosorbent;

b. injecting said pasty mixture into a molding cavity of a die under a pressure of at least about 2000 psi so as to shape the mixture to the desired shape of said body;

c. freezing the injected mixture in the molding cavity to form a self-supporting, frozen precursor of the body;

d. ejecting the frozen precursor from the cavity;

e. while still frozen, subjecting the frozen precursor to a sufficient vacuum for a sufficient time to freeze-dry the precursor, and temporarily bind the fibrils together by means of the organic hydrosorbent; and f. heating the precursor sufficiently to remove the organic hydrosorbent, and to permanently bond the particles together.

Ejecting the precursor from the mold while frozen, and freeze-drying the precursor permits easy ejection from the die and excellent shape retention of the body as the water is being removed from the hydrosorbent during freeze-drying. Moreover, freezing causes the vehicle to expand in the mold cavity thereby eliminating sink marks and shrink voids that otherwise commonly occur in injection molded parts. Finally, the porous nature of the freeze-dried precursor permits relatively quick thermal removal of the small amount of residual hydrosorbent without the need for a slow heating cycle typically required when all of the vehicle (e.g., wax) for the particles has to be removed by heating. In addition to the fibrils, some substantially equiaxed particles may also be included in the mixture up to an amount equal to the volume fraction of fibrils present, provided that the total particle concentration (i.e., fibril+equiaxed) does not exceed about 60% by volume.

DESCRIPTION OF THE PREFERRED EMBODIMENT

The invention will be better understood when considered in the light of the following detailed description thereof.

This invention is applicable to the manufacture of virtually any product which is made by molding a plurality of fibrils together with a fugitive binder, temporarily bonding the particles together with the binder to form a self supporting green body, burning off the fugitive binder, and finally sintering, or otherwise permanently bonding the fibrils together. Hence, the invention is applicable to both the metal and ceramic manufacturing arts. The invention is useful with such fibrils as (1) carbon/graphite, (2) ceramics (e.g., SiC, $Si_3N_4$, $K_2Ti_6O_{13}$, $Al_2O_3$, Kaowool [i.e., 47% $Al_2O_3$.53% $SiO_2$], Saffil [i.e., 96% $Al_2O_3$.4% $SiO_2$], $Al_{18}B_4O_{33}$, $Mg_2B_2O_5$, inter alia), and (3) metals (e.g., boron fibers, copper fibers, iron fibers, tungsten fibers inter alia). By "fibrils" is meant elongated particles which range in length from about 1 micron to about 500 microns, have diameters less than about 10 microns and have aspect ratios (i.e., length divided by diameter) greater than 3 (preferably greater than 20) and less than about 200.

As-molded green bodies made from fibrillose particles will typically comprise about 5% by volume to about 45% by volume fibrils. After firing, the bodies will contain about 7% to about 50% by volume. Some equiaxed particles may be admixed with the fibrils depending on the particular body being formed. Hence, for example, about 5% by volume of nickel particles may be added to Kaowool fibrils to make MMC preforms wherein the Ni particles serve to increase the wear resistance of the MMC. Examples of products made from fibrillose particles include airbag filters, ceramic MMC preforms, refractory furnace board and metal preforms, inter alia.

The invention is particularly effective in the manufacture of porous, self-supporting, fibrillose preforms which are destined to be infiltrated with molten metal in the manufacture of metal matrix composites (MMC). Such MMC preforms will preferably contain about 5% to about 45% by volume conventional filler fibrils, optionally some equiaxed particles, and the balance interstitial void space for filling with the matrix metal. The fibrils will preferably comprise ceramic materials because of their stiffness, strength and non-reactivity. However, carbon/graphite and metal fibrils may also be used for certain applications.

In accordance with the process of the present invention, the fibrils are mixed to a pasty consistency in a vehicle comprising an organic hydrosorbent and water. By "hydrosorbent" is meant a material which absorbs at least 3 times its own weight in water in the formation of a thickened or pasty hydrosol or hydrogel. By "pasty" is meant a non-pourable mass having a viscosity varying between about 500 poise to about 100,000 poise, and preferably between about 1000 poise to about 100,000 poise measured at a shear rate of one hundred reciprocal seconds (i.e., 100 1/sec as determined by capillary rheometry). To achieve such viscosities, and insure uniform mixing of the fibrils throughout the vehicle, the vehicle itself must have a viscosity of at least about 20 poise (i.e., at 100 1/sec shear rate measured on a Haake "Rotovisco"™ viscometer, Model RV-100). Below about 20 poise the fibril bundles as provided by the manufacturer thereof will not break apart and disperse uniformly throughout the vehicle, and the fibrils will settle out of the mix upon standing. If the fibrils are not uniformly distributed throughout the vehicle, the fibrils will not be uniformly distributed throughout the finished product (e.g., MMC). Above about 1000 poise, the vehicle yields mixes which are too thick to injection mold at reasonable pressures. The viscosity will preferably be about 50 poise to about 100 poise. The amount of hydrosorbent needed to achieve such vehicle viscosities will vary with the nature of the hydrosorbent. Hence, for example, at least about 5% by weight methyl cellulose is needed to achieve the requisite 20 poise level, whereas only about 1% by weight of PAN-starch (discussed hereafter) is needed. Mixing can be effected in any type of high shear commercially available mixer such as a roll compactor, planetary mixer, sigmoidal mixer, twin-screw extruder, etc.

While virtually any organic hydrosorbent is seen to be effective in forming a vehicle for the fibrils, hydrosorbents having water absorbencies of at least about 25 grams $H_2O$ per gram of hydrosorbent are preferred in order to maximize the water content and minimize the hydrosorbent content of the vehicle. Such hi-water/lo-hydrosorbent vehicles insure that only a small amount of organic binder remains in the body and needs to ultimately be burned out of the body since the remainder of the vehicle (i.e., water) will have been removed by freeze drying. Preferably, vehicles for the fibrils will comprise about 20 to about 50 parts by weight water for each part of hydrosorbent even though the hydrosorbent itself might have a capacity to absorb more water. Some suitable organic hydrosorbents for this purpose are corn starch, quar gum, xanthan gum, grain flours, gelatin, methyl cellulose, ethyl cellulose, certain hydrolyzed starch-graft copolymers and mixtures thereof which have been hydrated by the water to form a hydrosol. A particularly preferred hydrosorbent is a hydrolyzed starch-polyacrylonitrile graft copolymer described in Weaver et al. U.S. Pat. No. 3,935,099 issued Jan. 27, 1976, which is incorporated herein by reference. That material is generally dried, water-soluble, saponified starch-polyacrylonitrile graft polymer containing starch that had been gelatinized prior to graft polymerization (hereafter PAN-starch) marketed under the tradename Sanwet® by the Hoechst-Celanese company. Sanwet® IM-4000, for example, has a water absorbency of about 570 grams of $H_2O$ per gram of dry material, and has a high separation energy, i.e., has the ability to withstand mixing with fibrils in a twin-screw extruder without separating from its absorbed water. In this later regard, it has been observed that more intensive mixing is generally needed to obtain a uniform distribution of fibrils in a mixture than is required to obtain a uniform distribution of equiaxed particles. Some hydrosorbents cannot tolerate such intensive a mixing for a prolonged period without physically breaking down, and separating from the absorbed water. Separation of the hydrosorbent from the water is detrimental as it results in fiber-content inhomogeneities unsuitable for use. Hydrosorbents useful with fibrils should be able to produce fibril-hydrosorbent-water mixtures which can withstand mixing shear energies of at least about 60 Joules/$cm^3$ as determined by a torque rheometry test wherein the hydrosorbent-water-fiber mixture is mixed in a Brabender torque rheometer until phase separation is observed. The torque vs. time data recorded until phase separation occurs is then used to calculate the shear energy imparted to the mix which resulted in the breakdown of the mixture (i.e., separation of the absorbed water from the hydrosorbent). It was found that mixtures that could withstand at least 60 J/$cm^3$ of shear energy input before breakdown/separation had superior mixing and molding characteristics.

The shear energy per unit volume imparted to the mixture is calculated from the following formula:

$$\text{Shear Energy}_{(Joules/cm3)} = \left(\frac{A}{TV}\right)\cdot(D)\cdot(g)\cdot\left(\frac{1}{1000}\right)$$

where:

A=the area under the torque-time curve where torque is measured in meter-grams and time is measured in minutes V=the volume of the mix in $cm^3$ T=total mixing time in minutes g=acceleration due to gravity (9.806 m/$sec^2$)

D=angular displacement calculated by the formula $$D_{(Radians)}=S\times T\times 2\pi$$

where:

S=the revolution/min of the mixer

In addition to being highly water absorbent, the preferred, PAN-starch hydrosorbent has demonstrated a capability of producing fibril-hydrosorbent-$H_2O$ mixes which can withstand shear energies during mixing of as much as 600 Joules/$cm^3$ without separating from the water. When added to water, the PAN-starch forms a hydrosol comprising a plurality of small gel particles (sometimes referred to as microgels) suspended in water.

The vehicle for the particles will comprise a sufficient amount of hydrosorbent to achieve a viscosity level of at least 20 poise. The vehicle will preferably comprise about 1.0% to about 30% by weight of the PAN-starch and the balance water, and most preferably about 2% to about 5% by weight PAN-starch. How much hydrosorbent is actually needed for a given application will be dictated by which hydrosorbent is used, how much strength the green body requires, and the specific viscosity desired for molding, and the physical characteristics of the fibrils being molded. Ideally, the vehicle will have as little hydrosorbent present as is possible. With some of the hydrosorbents (e.g., PAN-starch), simply adding room temperature water is enough to form the corresponding hydrosol. In the case of cornstarch and grain (e.g., wheat) flours however, the mixture will have to be heated (i.e., typically to about boiling) to produce the hydrosol.

The water, hydrosorbent and fibrils may be mixed together all at the same time. Preferably, the water and hydrosorbent are mixed to form a gel, and the fibrils then mixed into the gel. However when a surfactant is used, it is preferred to first mix the fibrils with water containing the surfactant to provide a uniform wetting of the fibrils in the water before adding the hydrosorbent. The hydrosorbent is then added to the fibril-water mix.

A surfactant can be added to the fibril-water premix to promote wetting of the fibrils, and some breaking-up of the fibril bundles, before the hydrosorbent-water premix is added. Suitable surfactants for this purpose include sodium silicate, oleic acid, stearic acid, alcohol alkoxylates/secondary alcohol ethoxylates sold commercially under the tradename TERGITOL®, ammonium polyelectrolytes sold under the tradename DARVAN®, and modified polyalkoxylates sold commercially under the tradename TRITONX®, with TERGITOL® being preferred for use with Kaowool fibrils and PAN-starch. TERGITOL® is preferred here because its non-ionic composition does not greatly hinder the absorbency of the PAN-starch. The concentration of the surfactants will vary from about 0.1% by weight to about 2.5% by weight of the mixture, with about 0.5% being preferred for TERGITOL® with Kaowool.

A permanent binder material may also be added to the fibrilhydrosorbent mixture to promote permanent bonding of the particles together following firing. For ceramic bodies, binder materials such as colloidal silica or alumina in amounts that vary from about 1% to about 20% by weight of the ceramic particles are particularly effective.

To manufacture a self-supporting fibrillose body, the aforesaid pasty mixture may be subjected to a vacuum to remove any air entrained therein during mixing, and then injected under high pressure into the cavity of a suitable mold. High injection pressures are needed to move the fibril-laden, viscous mix into the mold cavity and uniformly distribute it throughout the cavity. If the mix is too thin (i.e., watery) the fibrils will not be uniformly distributed and the high injection pressure would cause the mix to flash between confronting mold parts. Preferably, the mix will be injected at pressures between about 4500 and 6000 psi, though pressure as low as about 2000 psi and as high as about 10,000 psi or more may be used. The pasty mixture is injected into a mold/die, and immediately frozen therein. To this end, the mold/die will preferably be prechilled to at least about 5 degrees centigrade below the freezing point of the vehicle in the mixture. Most preferably, the mold/die will be prechilled to at least about 15 degrees centigrade below the freezing point. The mixture remains in the mold cavity for a period of time sufficient to insure that the mixture freezes solid. Some expansion of the mixture will occur in the mold/die as freezing progresses, and accordingly provision is made in the mold design to allow for some of the mixture to exude out of the mold/die cavity particularly at thicker sections of the molded body) as it expands.

After the mixture has frozen solid, it is ejected from the mold/die while it is still frozen. The frozen vehicle serves to retain the shape of the body. While still frozen, the body is subjected to a sufficient vacuum for a sufficient period of time to freeze-dry the body to the point of "dryness". In this regard, enough water is removed so that no appreciable amount of water is thereafter lost from the molded body when it is heated to 80° C. in an oven at ambient pressure and relative humidity. While a lesser amount of drying is possible (and hence higher retained moisture), there is some risk that either (1) upon subsequent heating to remove the organic hydrosorbent, some sagging/slumping of the body could occur, or (2) steaming of the water during heating to remove the organic hydrosorbent could cause cracking and/or breaking apart of the body. Freeze-drying insures that the body does not slump, or otherwise change shape, during dewatering. Freeze-drying time is a function of the size of the body, the concentration and type of the particles, the concentration and type of organic hydrosorbent, the temperature used, and the strength of the vacuum used. Generally, freeze-drying will take about 2 to about 24 hours at vacuums of about 250 mtorr. Shorter drying times are possible at warmer temperatures, e.g., temperatures of 40° C. or higher can be used as long as the vacuum is maintained below the triple point pressure of water.

Following freeze-drying, the body is heated to burnout the organic hydrosorbent that remains and temporarily holds the fibrils together following freeze-drying. The temperature needed to burn out the hydrosorbent will depend on the composition of the hydrosorbent, and will typically vary from about 400° C. to about 550° C. Hence, for example, a temperature of about 500° C. is sufficient to burn out PAN-starch. For relatively small amounts of temporary binder (i.e., about 4% by vol. of the body) and highly porous bodies such as MMC preforms (i.e., 90% porous), heating rates as high as about 1000° C./hr. in air can be used to burn off the organic hydrosorbent. Since these binders pyrolize without melting, they do not soften and allow the preform to distort during this step. Further heating at higher temperatures is used to either sinter, or otherwise bond (e.g., with colloidal silica or alumina), the fibrils together. The temperature and treatment time required will vary with the composition of the fibrils, and whether or not there is a permanent binder present and its composition. Continued heating after permanent bonding has occurred may be employed to densify the body, as is well known in the art.

The invention is particularly useful for manufacturing MMC-preforms from ceramic fibrils. MMC-preforms will preferably be made by mixing one (1) part by weight hydrolyzed starch-polyacrylonitrile graft copolymer purchased from the Hoescht-Celanese Company under the tradename SANWET® with 25 parts by weight water to form a vehicle to which is added (i) about twenty-one (21) volume percent Kaowool and (ii) colloidal silica in an amount equal to about three (3) to about ten (10) percent of the weight of the Kaowool. The materials are blended together at room temperature for about 8 minutes to a consistency of about 500 poise to about 10,000 poise in a twin-screw extruder operating at about 100 to about 200 revolutions per minute. The resulting pasty mixture is transferred to an injection molding machine and injected into a prechilled (i.e., $-5°$ C. to $-40°$ C.) die at an injection pressure of about 2000 psi to about 10,000 psi (preferably 4500–6000 psi) depending on the preform design. The injected mix is maintained in the die cavity until it has frozen hard. The time to freezing will vary with size of the preform. Following freezing, the frozen preform is ejected from the die and, while still frozen, is subjected to a vacuum under 300 mtorr for a period of time (e.g., about 2 to about 24 hours) sufficient to freeze-dry the preform to dryness. Thereafter, the green preform is baked in air at about 800° C. to about 1300° C. to destroy the organic hydrosorbent (and any other organic matter) by a combination of evaporation, pyrolysis and oxidative decomposition, and to bind the Kaowool fibrils together via the colloidal silica. As the green preform is quite porous, heating rates as high as 1000° C./hr. have been successfully used. Lower rates, of course, will also work. For example, preforms have been successfully made at heating rates of 200–600° C./hr. Alternatives to the above include (1) replacing the PAN-starch with 30% to 40% by weight grain (e.g., wheat) flour and thickening the mixture by boiling, or (2) replacing the PAN-starch with 10% to 30% by weight cornstarch and thickening the mixture by boiling.

EXAMPLE 1

Eleven MMC-preforms were made in the shape of a ring from a pasty mixture comprising four (4) weight percent PAN-starch, eight (8) volume percent Kaowool, colloidal silica in amount equal to three (3) percent by weight of the Kaowool and the balance water. These ingredients were mixed for 90 minutes in a conical double-planetary mixer at 100 rpm. The PAN-starch was first allowed to absorb the water for 15 minutes before the Kaowool was added. The Kaowool was added in roughly three equal parts over the first 15 minutes of mixing to aid in dispersion and allow for volume reduction. The colloidal silica was added during the final 10 minutes of mixing. The pasty mixture was transferred to a Gluco pneumatic injection molding machine (piston-type) and injected at an injection pressure of 2000 psi into a ring die prechilled to $-25°$ C. The material was allowed to chill in the die for 4 minutes, at which point the solid ring was ejected from the die. The frozen rings were placed in a freeze dryer with a chamber maintained at a temperature of 20° C. under a vacuum of 50 millitorr, and held there for 18 hours. Thereafter, the rings were heated at a rate of 15° C./min. to a temperature of 1000° C. and held there for 120 minutes. Table 1 sets forth the average weight and dimensions for the eleven rings tested at different stages in the process. The percent change calculations were made by calculating the percent change for each part (using the frozen properties as the divisor), and then taking the average of those individual percent changes.

TABLE 1

| Frozen | Freeze Dried | Percent Change | Burned Out | Percent Change |
|---|---|---|---|---|
| WEIGHT (gms) | | | | |
| 50.69 | 10.61 | −79.06 | 9.21 | −81.83 |
| OUTSIDE DIAMETER (mm) | | | | |
| 110.45 | 110.24 | −0.19 | 107.58 | −2.59 |
| THICKNESS (TOP TO BOTTOM) | | | | |
| 12.59 | 12.36 | −1.87 | 11.87 | −5.73 |
| THICKNESS (OD-ID) | | | | |
| 13.73 | 13.52 | −1.51 | 12.91 | −6.01 |

The molded rings were freeze-dried, twelve (12) at a time, by placing them on shelves cooled to −35° C. When the vacuum reached 250 mtorr, the shelves were ramped up in temperature to 50° C. over four (4) hours and held at 50° C. for an additional fifteen (15) hours. After six hours at 50° C., the vacuum was allowed to go as high as possible, and reached 10 mtorr nine hours later, by which time the freeze drying was complete.

The preforms were then fired by ramping the furnace temperature up to 1100° C. over 90 minutes and holding at this temperature for two (2) hours. Table II shows the averages and variations in preform weight and dimensions for the various molding conditions.

TABLE II

| CONDITION | PACKING* PRESSURE (psi) | FILL TIME (sec) | FIRED▲ WEIGHT (grams) | OUTER▲ DIAMETER (mm) | RING▲ THICKNESS (mm) | RING▲ WIDTH (mm) |
|---|---|---|---|---|---|---|
| AY1 | 1920 | 2.0 | 9.65 | 102.06 | 10.87 | 12.41 |
| AY2 | 3070 | 1.0 | 10.05 | 102.51 | 10.87 | 12.48 |
| AY3 | 770 | 3.0 | 9.41 | 101.71 | 10.78 | 12.27 |
| AY4 | 3070 | 3.0 | 9.44 | 101.77 | 10.76 | 12.29 |
| AY5 | 770 | 1.0 | 9.26 | 101.89 | 10.83 | 12.33 |

*Packing pressure is the pressure maintained on the cavity after the part is full. The injection pressure used to fill the cavity was a maximum of 7000 psi for all conditions.
▲All reported measurements are the average of several recorded measurements.

EXAMPLE 2

Twenty-five MMC preforms were molded into a ring shape from a pasty feedstock comprised of 8 volume percent Kaowool, with colloidal silica equal to 10 weight percent of the Kaowool. The remaining 92 volume percent comprised a four weight percent gel of PAN-starch and water, containing Tergitol TMN-10 surfactant in a concentration equal to 0.5 weight percent of the water. The mix was compounded in a twin-screw extruder, but was first pre-mixed in a vat mixer at 60 rpm for 45 minutes. The water and surfactant were added first, followed by the Kaowool. The PAN-starch was added during the final 15 minutes of mixing. This pre-mix was processed six (6) times through a twin-screw extruder at 200 rpm, the colloidal silica was kneaded into the mixture, and the mixture was processed for another two passes through the twin-screw extruder.

The pasty mixture was injection-molded into rings using a Van Dorn 80 ton reciprocating-screw injection molding machine. A flexible screw and hose system, which was loaded with material by hand, fed the throat of the injection molding machine. The mixture was injected at room temperature at a maximum pressure build-up of 7000 psi into a die maintained at −15° C. The pressure was maintained for 90 seconds and the part was allowed to freeze in the die an additional 70 seconds before ejection. Five different combinations of fill time and packing pressure were used, and are given in Table II.

EXAMPLE 3

A preform in the shape of an IC engine connecting rod is prepared from a mix as set forth in Example 2, except for using 30 volume % (v/o) Kaowool, and pumping the pasty mixture at 3000 psi into one of several chilled dies on a rotating carrousel. The mixture is pressurized only for the one to three (1–3) seconds required to fill the die through its gate non-return valve. The injection cylinder draws back, and the filled mold rotates out of the way, bringing in line the next mold for filling. Meanwhile, the filled die would experience an increase in internal pressure due to the freezing of the part until the pressure exceeded the restraining force of the relief valve at the gate, whereupon internal pressure would remain constant and the mix would ooze out of the relief valve until the gate froze. This is necessary to prevent the expansion of the part upon freezing from damaging the die. As the part is freezing, it is rotated around the carrousel until it is sufficiently frozen (total time 3–4 minutes), at which time it is rotated to an ejection station. Thereafter, the die is re-clamped and rotates into position to be re-filled by the injection cylinder. The ejected part is then freeze-dried and fired in a manner similar to Example 2.

Mixes in accordance with the present invention also offer three unique features compared to standard powder injection molding compositions. First, due to their expansion on cooling, there is no need for the injection system to provide pressure during the pack portion of the cycle to compensate for shrinkage. Rather, such pressure could be maintained by having a pressure-loaded (and adjustable, if needed) relief valve on the die sprue, allowing the part itself to maintain the desired internal pressure as freezing occurs. Also, the reciprocating screw is superfluous, as these mixtures are already plastic at room temperature. Thirdly, the molding pressure required for the lower viscosity hydrosorbent-fibril mixes are modest (i.e., as low as 2000 psi) compared to standard high pressure injection molding—though much higher pressures can be used, and indeed are needed for the higher viscosity mixes.

We claim:

1. A method of making a porous fibrillose body from a plurality of fibrils bonded together into a self-supporting structure comprising the steps of:
    a. preparing a substantially homogeneous pasty mixture comprising about 5% to about 45% by volume of fibrils and about 95% to about 55% by volume of a non-newtonian liquid vehicle comprising water and a sufficient amount of an insoluble organic hydrosorbent to thicken said vehicle to a viscosity of about 20 poise to about 1000 poise at 100 reciprocal seconds shear rate and to provide a said mixture which is capable of withstanding mixing shear energies of at least about 60 Joules/cm$^3$ without separation of said water from said hydrosorbent;
    b. injecting said pasty mixture into a molding cavity of a die under a pressure of at least about 2000 psi so as to shape said mixture to a desired shape for said body;
    c. freezing said mixture in said molding cavity to form a self-supporting, frozen precursor of said body;
    d. ejecting said frozen precursor from said cavity;
    e. while still frozen, subjecting said frozen precursor to a sufficient vacuum for a sufficient time to freeze-dry said precursor, and temporarily bind said fibrils together by means of said hydrosorbent; and
    f. heating said precursor sufficiently to remove said hydrosorbent and to permanently bond said particles.

2. The process according to claim 1 including the step of preparing a gel of said hydrosorbent and water, and thereafter adding said fibrils to said gel.

3. The process according to claim 1 wherein said mixture contains a supplementary binder for effecting said permanent bonding of said particles.

4. The process according to claim 3 wherein said supplementary binder is present in an amount of about 1% to about 20% by weight of said fibrils, and is selected from the group consisting of colloidal silica and alumina.

5. The process according to claim 1 including maintaining said die at a subfreezing temperature during said injecting.

6. The process according to claim 5 wherein said temperature is at least about 5 degrees centigrade below freezing.

7. The process according to claim 1 wherein a surfactant is added to said water, and thereafter said fibrils are added to said water to form a suspension and then said hydrosorbent added to said suspension.

8. The process according to claim 7 wherein said surfactant is selected from the group consisting of alcohol alkoxylates/secondary alcohol ethoxylates, ammonium polyelectrolytes, sodium silicate and modified polyalkoxylates.

9. The method according to claim 1 wherein said fibrils are selected from the group consisting of metals, carbon and ceramics.

10. The method according to claim 9 wherein said hydrosorbent is hydrolyzed starch-polyacrylonitrile polymer.

11. The method according to claim 10 wherein said mixture also contains a surfactant comprising alcohol alkoxylates/secondary alcohol ethoxylates.

12. The method according to claim 1 wherein said hydrosorbent is selected from the group consisting of cornstarch, gelatin, hydrolyzed starch-polyacrylonitrile polymer, methyl cellulose and ethyl cellulose.

* * * * *